United States Patent

[11] 3,634,868

[72] Inventors Milton H. Pelavin
White Plains;
Allan I. Koszyn, Yonkers; Earl Heier,
Ardsley, all of N.Y.
[21] Appl. No. 19,194
[22] Filed Mar. 13, 1970
[45] Patented Jan. 11, 1972
[73] Assignee Technicon Instruments Corporation
Tarrytown, N.Y.

[54] METHOD AND APPARATUS FOR AUTOMATIC BASELINE AND STANDARD CALIBRATION OF AUTOMATIC, MULTICHANNEL SEQUENTIALLY OPERABLE FLUID SAMPLE SUPPLY, TREATMENT AND
27 Claims, 4 Drawing Figs.

[52] U.S. Cl............................................. 235/151.3,
73/1 R, 356/39, 356/179, 330/9
[51] Int. Cl....................................................G01n 21/20
[50] Field of Search..........................................235/151.35,
151.3, 183; 356/179; 346/32; 73/1

[56] References Cited
UNITED STATES PATENTS
3,241,432  3/1966  Skeggs et al. ................. 356/179
3,504,521  4/1970  Luckers........................ 73/1 R
3,534,402  10/1970  Crowell et al................. 235/151.3 R Primary Examiner—Eugene G. Botz
Attorneys—S. P. Tedesco and S. E. Rockwell ABSTRACT: New and improved method and apparatus for automatic, periodic baseline and standard calibration of analysis results recording means which record the results of sample analyses performed by multichannel sample analysis means in accordance with the output of the latter are provided to compensate for drift in said analysis means output, and comprise the conditioning of said sample analysis means and the adjustment of said output to a desired value for baseline calibration for each of said channels, the conditioning of said sample analysis means and the adjustment of said output to a desired value for standard calibration for each of said channels, the comparison of said output with said desired value thereof for baseline calibration for each of said channels and, if drift has occurred, the generation of information to drive said output to said desired value for baseline calibration, the comparison of said output with said desired value thereof for standard calibration for each of said channels and, if drift has occurred, the generation of information to drive said output to said desired value thereof for standard calibration, the storing of said baseline and standard calibration information for each of said channels for repeated reuse in sequence with channel changes during sample analysis operation of said sample analysis means, and the updating of said standard and baseline calibration information for each of said channels by the standard and baseline calibration information generated during subsequent operation of said calibration apparatus.

NEW AND IMPROVED METHOD AND APPARATUS FOR AUTOMATIC BASELINE AND STANDARD CALIBRATION OF AUTOMATIC, MULTICHANNEL SEQUENTIALLY OPERABLE FLUID SAMPLE SUPPLY, TREATMENT AND ANALYSIS MEANS

Background of the Invention

1. Field of the Invention

This invention relates to new and improved method and apparatus for automatic baseline and standard calibration of automatic, sequentially operable fluid analysis means and, more particularly, for such use in conjunction with the automated, sequential analysis of series of blood samples with regard to a plurality of different blood sample constituents.

2. Description of the Prior Art

Although currently available automatic, multiple channel sequentially operable fluid analysis apparatus in the nature, for example, of those manufactured and marketed as the SMA ® 12/60 apparatus by applicants' assignee, the Instruments Corporation of Tarrytown, New York, do include calibration means to enable the periodic calibration thereof to correct the permanently recorded blood sample analysis results for drift as occasioned primarily by the electronic, chemical and hydraulic operational characteristics of the apparatus and thus periodically check the accuracy of such results, it may be understood that such calibration means are substantially manually operable whereby the satisfactory calibration of such analysis apparatus become a somewhat tedious and time-consuming task requiring relatively frequent, periodic manual adjustment of pluralities of baseline and standard calibration setpoints. More specifically, such analysis apparatus is operable to divide each of a series of blood samples to be analyzed into 12 different portions and to analyze each of said portions with regard to a different blood sample constituent and provide a permanent record of such analysis on the chart of a strip chart recorder, it may be understood that a satisfactory calibration cycle in such instance requires the manual and careful adjustment of a baseline potentiometer and a standard potentiometer for each of said analysis channels, concomitant with the careful visual observation of said recorder strip chart to determine the effects of such potentiometer adjustments the manual and careful adjustment, as described, of a total of 24 calibration potentiometers to satisfactorily calibrate such apparatus, with the accuracy of such potentiometer adjustments being dependent upon the skill and conscientiousness of the operator to thus introduce a very real factor of significant calibration inaccuracy as occasioned by human error and/or simple inattention to the somewhat tedious task at hand. Since a relatively high analysis and recording rate is a salient feature of such apparatus, and since the time available for such calibration thereof must, of necessity, be commensurate with said relatively high analysis and recording rates, each of said potentiometers must be carefully adjusted to the proper settings thereof, as described, in as little as 5 seconds which further increases the possibility of significant calibration inaccuracy. In addition, it may be further understood that the improved versions of analysis apparatus currently under development will be operable to significant advantage at even higher blood sample analysis and recording rates, whereby the time available for a calibration cycle will be further decreased to place further demands upon the skill and attention of the operator with regard to satisfactory apparatus calibration.

OBJECTS OF THE INVENTION

It is, accordingly, an object of this invention to provide new and improved method and apparatus for the automatic, highly accurate baseline and standard calibration of automatic, sequentially operable, multiple channel fluid analysis apparatus to thereby substantially eliminate human error as a factor in such calibration and better guarantee the accuracy of the recorded fluid sample analysis results.

Another object of this invention is the provision of method and apparatus as above which are operable to effect such baseline and standard calibration in a relatively short period of time which is well within the available calibration time to thus in no way detract from the advantageous relatively high speeds of operation of said fluid analysis apparatus.

Another object of this invention is the provision of apparatus as above which require only readily available components of proven dependability in the fabrication thereof, to thus maintain apparatus cost at a relatively low level, and provide for long periods of satisfactory, substantially maintenance free apparatus operation.

A further object of this invention is the provision of method and apparatus as above which are particularly adapted for use in conjunction with automatic, sequentially operable, multiple channel fluid analysis apparatus of the type disclosed in U.S. Pat. No. 3,241,432 issued Mar. 22, 1966 to Dr. Leonard T. Skeggs, et al.

SUMMARY OF THE INVENTION

As disclosed herein in a preferred embodiment for use in conjunction with automatic, sequentially operable, multiple channel blood analysis apparatus of the type disclosed in said U.S. Pat. No. 3,241,432, the automatic baseline and standard calibration apparatus of the invention are interconnected between the colorimetric means which function to perform the desired blood sample analyses, and the strip chart recorder which provides a permanent and readily reproducible record of the results of such analyses, with the automatic baseline and standard calibration apparatus of the invention functioning to automatically condition or calibrate the output from said colorimetric means and apply the thusly conditioned output to said strip chart recorder.

The automatic baseline and standard calibration apparatus of the invention may be understood to be comparable to a servomechanism without moving parts which utilizes the techniques of analog-to-digital and digital-to-analog conversions, and comprise a baseline calibration resistance network with operatively associated D/A memory means to control the resistance thereof, a standard calibration resistance network with like operatively associated D/A memory means to control the resistance thereof, and a feedback loop which is selectively closeable through said memory means to vary the respective resistances of said resistance networks through the generation of error signals in response to drift in said analysis means.

In use, and after the performance of a number of partially manual apparatus setup and initialization procedures to properly set up said memories in response to said error signals to, in turn, force the output of said colorimetric means to the desired baseline and standard levels for each of said analysis channels, the digital information which is associated with the baseline and standard calibration of each analysis channel is stored in sequence in the appropriate baseline and standard calibration memory means. During analysis, this digital information is simply read out of and read back into said memory means in synchronism with analysis channel changes to set the corrective resistance networks accordingly in each instance.

The automatic baseline and standard calibration cycles, in that order, for each of said 12 channels are initiated when fluids of 0 concentration for baseline calibration and a standard fluid for standard calibration introduced into the analysis apparatus are flowed, in that order through the colorimetric means, if any, is detected for each of said channels and the output of colorimetric means corrected therefor by the generation of appropriate error signals in said feedback loop and the application thereof to said baseline and standard memory means to update the digital information stored therein for the analysis channel of interest and vary the resistance of the relevant baseline or standard resistance network accordingly. In addition, this updated digital information for baseline and standard calibration of each of said analysis channels is stored for repeated reuse, in synchronism with analysis channel changes during subsequent blood analysis operation of the analysis apparatus.

DESCRIPTION OF THE DRAWINGS

The above and other objects and advantages of this invention are believed made clear by the following detailed description thereof taken in conjunction with the accompanying drawings, wherein.

DETAILED DESCRIPTION OF THE INVENTION

Figure 1:
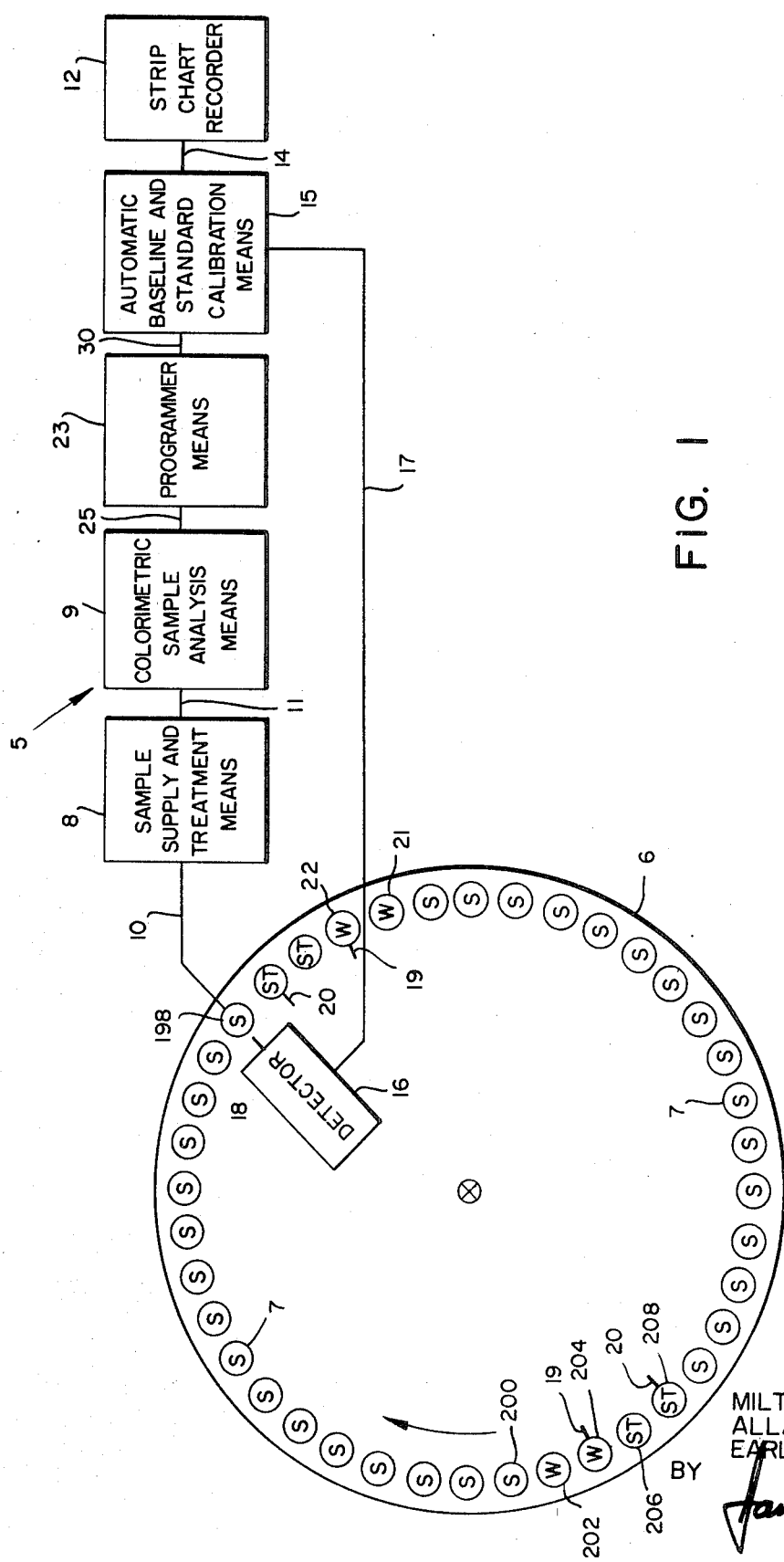
FIG. 1 illustrates a typical application of the automatic calibration apparatus of the invention to automatic analysis means.

Referring now to FIG. 1, automatic, sequentially operable fluid analysis means are indicated generally at 5 and may be understood to automatically supply a series of spaced fluid samples, automatically divide each of the same into a plurality of fluid sample portions, automatically treat each of said fluid sample portions in manner appropriate to the quantitative analysis thereof with regard to a different fluid sample constituent, and automatically sequentially colorimetrically analyze each of the thusly treated fluid sample portions and provide a permanent and readily reproducible recording of the results of such analysis. More specifically, said fluid analysis means may, for example, take the form of an improved version of those shown and described in U.S. Pat. No. 3,241,432 issued Mar. 22, 1966 to Dr. Leonard T. Skeggs et al., and assigned to the assignee hereof, and, as such, would comprise a turntable 6 upon which are disposed as shown a generally circular array of fluid sample containers 7.

Sample supply and treatment means are indicated generally at 8, and colorimetric sample analysis means are indicated generally at 9, and the former may be understood to be effective, upon indexing of the turntable 6 to present each of the sample containers in turn at an offtake position, to aspirate said fluid samples in turn from said containers as indicated by line 10, divide each of the same into, for examples, 12 sample portions and treat each of said sample portions by the addition of a suitable, color-producing or color-reducing reagent thereto for colorimetric quantitative sample portion analysis with regard to a different sample constituent, and supply the thusly treated sample portions in sequence as indicated by line 11 to the sample analysis means 9 for sequential colorimetric quantitative analysis thereof as described in the latter. Programmer means are indicated generally at 23 and are operatively associated with said colorimetric sample analysis means as indicated by line 25.

A null-balance-type DC strip chart recorder is indicated at 12 and is connected as indicated by lines 25, 30 and 14, respectively, through said programmer means and through automatic baseline and standard calibration means as indicated at 15, to the output side of the colorimetric sample analysis means 9. Strip chart recorder 12 provides a strip chart graph which constitutes a permanent and readily reproducible record of the respective, sequentially provided results of the colorimetric analyses of the appropriately treated fluid sample portions.

A problem in the operation of the respective sample supply and treatment means 8, the colorimetric sample analysis means 9, and the strip chart recorder 12 resides in the fact that drift, as occasioned primarily by changes in the electronic, chemical and hydraulic operational characteristics of such components, will occur over a relatively short period of time with the result that the recorder strip chart graph will no longer be accurately representative of the amounts of the respective blood sample constituents of interest. Accordingly, the automatic baseline and standard calibration means 15 of the invention functions to automatically and periodically effect a two-point calibration of the strip chart recorder 12, that is, by automatically and periodically adjusting the recorder pen, if necessary, to ensure that the same tracks through the baseline or 0 optical density point for each of the blood sample constituents of interest as illustrated by the graph 16R in FIG. 3, and to then automatically adjust said recorder pen, if necessary, to ensure that the same tracks through a predetermined standard or high point for each of the blood sample constituents of interest as illustrated by the graph 17R of FIG. 4, as described in greater detail hereinbelow.

To this effect, and assuming there to be a total of 40 sample containers 7 on the turntable 6 as illustrated in FIG. 1, two groups of 16 each of said sample containers would be filled with blood samples S for analysis, while the remaining eight of said sample containers would be arranged as shown in generally opposed manner in groups of four containers each. Thus, and assuming rotation of the turntable 6 in the clockwise direction as indicated, it may be seen that the leading two containers of each of said four container groups would be filled with a fluid W of substantially 0 concentration, for example, of distilled water for flow through the colorimetric sample analysis means 9 to enable the periodic automatic baseline calibration function to be performed by the calibration means 15, while the trailing two containers of each of said four container groups would be filled with a standard fluid ST for flow through the colorimetric sample analysis means 9 to enable the periodic automatic standard calibration function to be performed by said calibration means.

Detector means are indicated at 16 and are disposed, as shown, generally opposite said offtake position. Said detector means are operably connected as indicated by line 17 to the automatic baseline and standard calibration means 15 to control the timing of the automatic calibration function of the latter. This is, said detector means are effective to sense when the trailing water container and the trailing standard fluid container of each of said four container groups have been indexed by movement of the turntable 6 into said offtake position and to commence the operation of baseline and standard timers which are included, as described in detail hereinbelow, in the automatic baseline and standard calibration means. Such baseline and standard timers will respectively "timeout" just as the distilled water from said trailing water container and the standard fluid from said trailing standard fluid container have respectively completed the flow thereof through the sample supply and treatment means 8 and have commenced to flow through the colorimetric sample analysis means 9. The function of the leading distilled water container and the leading standard fluid container is, in each instance, to ensure the removal of the residue of any preceding fluids from the colorimetric sample analysis means 9, and thus ensure that steady-state distilled water and standard fluid operational conditions have been reached prior to the start of the automatic baseline and standard calibration cycles.

A sensor as indicated schematically at 18 is provided on the detector means 16, while sensor actuating means for actuation of said sensor means 18 are respectively schematically indicated at 19 and 20 on each of the trailing distilled water and standard fluid containers of each of said four container groups. The sensor and sensor actuating means may, of course, take any suitable mechanical, electrical or optical form. Thus, for example, as the trailing distilled water container 22 is indexed into said offtake position generally opposite the detector means 16, the sensor actuating means 19 will be effective to actuate the sensor means 18 to operate the detector means 16 to commence operation of the baseline timer of the automatic baseline and standard calibration means 15. Said baseline timer will not "timeout" to commence automatic baseline calibration, however, until such time as the distilled water from trailing distilled water container 22 has been aspirated from said container, flowed through the sample supply and treatment means 8, and commences to flow through the colorimetric sample analysis means 9. These same considerations are, of course, true with regard to the leading and trailing standard fluid containers and the standard timer means of the automatic baseline and standard calibration means 15 of the invention.

Figure 2:
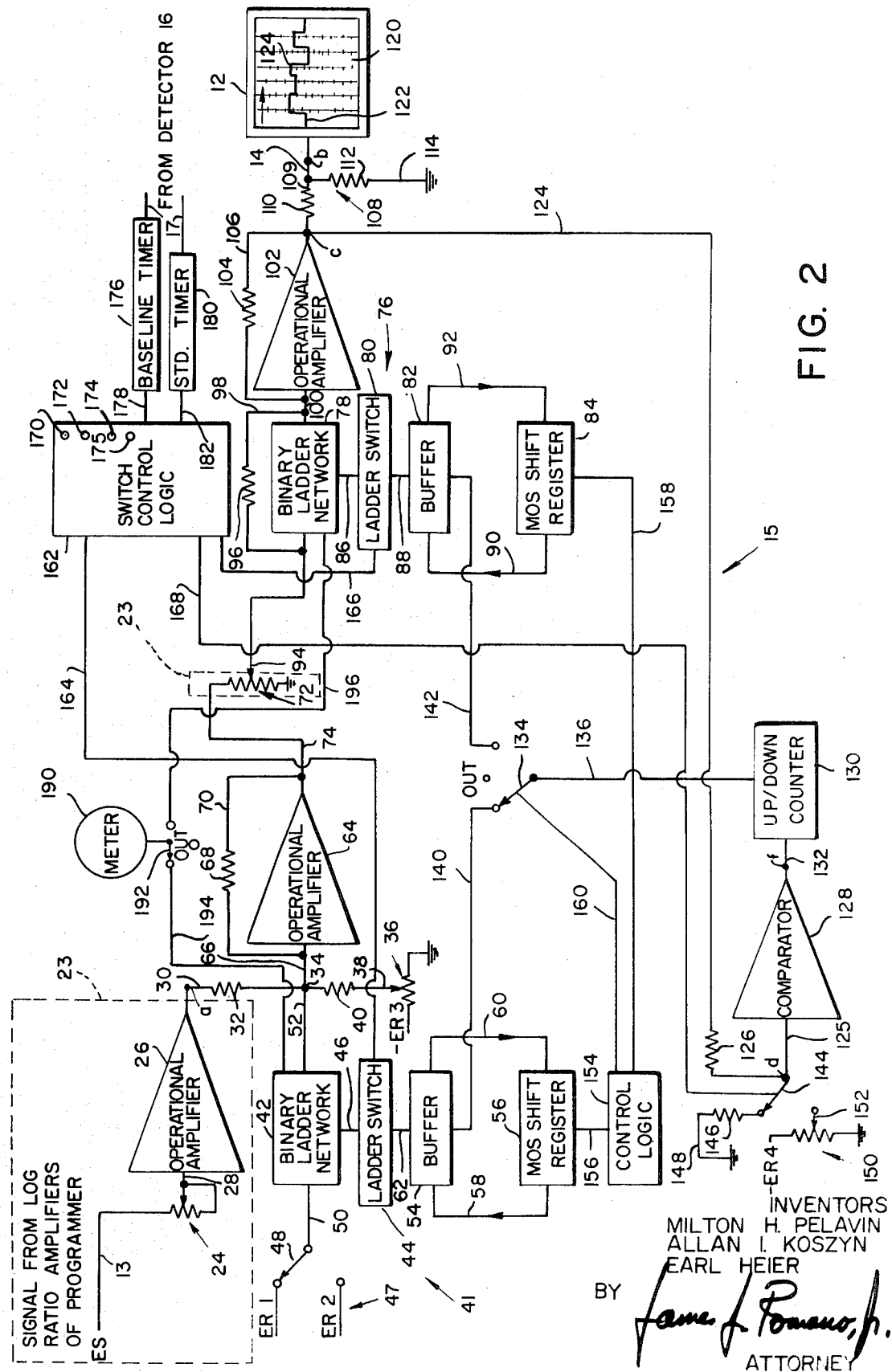
FIG. 2 is a schematic diagram of automatic calibration apparatus constructed and operative in accordance with the teachings of this invention.

Referring now to FIG. 2, circuit components which are included in the programmer means 23 are indicated as such by the dashed line boundary 23 drawn therearound, and comprise a line 13 on which are applied, as indicated, from the nonillustrated, programmer means log ratio amplifiers, the input signals ES representative of the results of the respective, automatic sequential fluid sample portion analyses as described hereinabove.

A manually adjustable low or baseline calibration potentiometer is indicated at 24 and is connected as shown in the signal input line 13. For use as described in greater detail hereinbelow in conjunction with 12 channel, automatic sequentially operable fluid analysis means wherein each fluid sample is constituted by a blood sample from a different patient and is automatically sequentially analyzed for 12 different constituents thereof, 12 of the low or baseline calibration potentiometers 24 would be provided in the programmer means 23, with each of the same being connectable in turn in line 13 by nonillustrated, channel-synchronized switching means and functioning to provide for manual calibration of said baseline for a different one of said fluid analysis channels.

An operational amplifier is indicated at 26, and the arm 28 of the baseline calibration potentiometer 24 is connected thereto as shown to enable the application of the potentiometer output as the input to said operational amplifier.

The output of the operational amplifier 26 of the programmer means 23 is applied on line 30 through a summing resistor 32 to a node 34. A trimming potentiometer is indicated at 36, and a reference voltage —ER3 from any suitably regulated power supply source is applied thereto as indicated. The potentiometer arm 38 is connected as shown through a summing resistor 40 to the node 34.

Automatic calibration means for automatic baseline or low calibration of the strip chart recorder 12 are indicated generally at 41 and take the form of a feedback type of digital converter which includes a digital to analog resistive network as part of the closed loop. More specifically, said automatic calibration means comprise a binary ladder or resistance network as indicated at 42 which is controlled by digital signals applied thereto through ladder switch 44 as indicated by line 46. As utilized herein, the binary ladder network 42 may, for example, comprises eight bit positions whereby the resistance thereof may be ranged from a low of 0000000 to a high of 11111111, and to have a midrange position or resistance value of 10000000. This is to say that said ladder network may be considered to comprise eight sets of resistors, each of which is connectable in said network in response to the application thereto of a bit in a different one of said eight bit positions through said electronic ladder switch 44. For purposes made clearer hereinbelow, it may be understood that the range through which the ladder network 42 may be varied is predetermined to be commensurate with the maximum range of drift which would normally be encountered.

Baseline or low calibration sensitivity control means are indicated generally at 47 and are operable to vary the sensitivity of the automatic baseline calibration means 41 in accordance with sensitivity of the blood sample constituent analysis of interest. More specifically, the sensitivity control means 47 comprise a two-position relay contact 48 which is movable between the depicted position thereof in which the same will be effective to apply a relatively high reference voltage ER1 to the binary ladder network 42 on line 50, and a second position thereof in which the same will be effective to apply a relatively low reference voltage ER2 to said binary ladder network. For a relatively high sensitivity constituent analysis, the relay contact 48 would be positioned, as depicted, to apply the reference voltage ER1, while for a relatively low sensitivity constituent analysis the said relay contact would be positioned to apply the reference voltage ER2.

The output of the binary ladder network 42 is applied as indicated on line 52 to node 34. To ensure a current of 0 on line 66 concomitantly with the application on line 30 of an input signal ES of 0, trimming potentiometer 36 may be adjusted appropriately, if necessary, to absorb the current from ladder network 42 and thus ensure 0 current on line 66.

A buffer is indicated at 54, and a static MOS shift register is indicated at 56, with said buffer and shift register being operatively associated in conventional manner as indicated by lines 58 and 60 to enable the circulation of digital information from said shift register to said buffer and the return of said information to the former. In addition, the buffer 54 is connected as indicated by line 62 to the electronic ladder switch 44 whereby digital information which is at any given time stored in the buffer 54 may be applied therefrom as a digital signal on line 62 through electronic ladder switch 44 and line 46 to the binary ladder network 42 to establish the position or resistance value of the latter in accordance with the binary content of said digital signal. More specifically, and for use as described with a 12-channel analysis system, static MOS shift register 56 will have a storage capacity of 11 of said digital signals which, when combined with the digital signal present in the buffer 54 at any given point in time, will enable the sequential provision in synchronism with analysis channel changes of 12 digital signals to the ladder network 42. Each such signal is effective to establish the position or resistance value of said ladder network 42 at a level commensurate with the baseline or low calibration of the strip chart recorder 12 for a different blood sample portion constituent analysis.

An operational amplifier is indicated at 64 and the signal from mode 34 is applied as the input thereto as indicated by line 66. A feedback resistor 68 is connected as shown across the operational amplifier 64 by line 70 to set the gain thereof.

Further included in the programmer means 23 is a manually adjustable standard or high calibration potentiometer 72, and the output signal from operational amplifier 64 is applied thereto on line 74. For use with a 12-channel, analysis system, the said programmer means would include 12 of such standard or high calibration potentiometers, with each of the same being connectable in turn in line 74 by nonillustrated, channel-synchronized switching means and functioning to provide for manual standard or high calibration for a different one of said fluid analysis channels.

Automatic calibration means for the automatic standard or high calibration of the strip chart recorder 12 are indicated generally at 76 and may be understood to be configured and operable in substantially the same manner as are the automatic baseline or low calibration means 41. More specifically, the automatic standard or high calibration means 76 comprise a ladder network 78, an electronic ladder switch 80, a buffer 82, and a static MOS shift register 84 operatively interconnected as shown by lines 86, 88, 90 and 92 in the same manner as described for the like components of the automatic baseline or low calibration means 41.

The signal output from the arm 94 of the standard or high calibration potentiometer 72 is applied as indicated as the input to the binary ladder network 78, while a shunt resistor 96 is connected as shown across said network by line 98. The output from the binary ladder network 78 is applied as indicated by line 100 as the input to an operational amplifier 102, while a feedback resistor 104 is connected as shown across said operational amplifier by line 106, again to set the gain thereof. The gain across the combined ladder network 78 and operational amplifier 102 set a function of the respective resistances of shunt resistor 96 and feedback resistor 104, and the position of ladder network 78. Accordingly, and if it is assumed that a maximum variation of such gain of ±20 percent is desired, the range in position or resistance value of the ladder network 78 from the midrange position thereof need only be sufficient to provide for ±20 percent gain variation.

A voltage divider or attenuator is indicated generally at 108 and comprises a resistor 110 connected as shown in amplifier output line 109, and a resistor 112 connected therefrom as shown to ground in line 114. With each of the ladder networks 42 and 78 set at the respective midrange positions thereof, and assuming the gain of operational amplifier 64 to be −10, and the gain of ladder network 78 and operational amplifier 102 to be −15 to result in an overall system gain of 150, and assuming a desired overall system gain from point $a$ to point $b$ of unity, the provision of a 150–1 voltage divider or attenuator 108 will be effective to establish the desired overall system gain.

The null-balance-type, DC strip chart recorder is again indicated at 12 and may, for example, take the general form of that shown and described in said U.S. Pat. No. 3,241,432. Such strip chart recorder will include a driven strip chart 120 which is driven in the indicated direction, and a recorder pen or stylus 122 which is operable in response to the output signal from the operational amplifier 102, as applied to the recorder through on line 14, to trace a graph 124 thereon to record of the results of the fluid analyses of interest as represented by the magnitude of the input signal ES from the colorimetric sample analysis means 9.

A line 124 supplies the output signal from the operational amplifier 102 through a summing resistor 126 as a feedback signal to comparator means 128 on line 125. Up/down counter means are indicated at 130, and the output signal from the comparator means 128 is applied thereto as indicated by line 132. Three-position, calibration network control switch means are indicated at 134, and the output signal from the up/down counter means 130 is applied thereto as indicated by line 136. In the depicted position thereof, control switch means 134 will be operable to apply the output from up/down counter means 130 to buffer 54 as indicated on line 140. Alternatively, in a second position thereof, the three-position switch means 134 will be effective to apply said up/down counter means output to buffer 82 as indicated on line 142. With the three-position switch means 134 in the "out" position thereof, no circuit application will be made of said up/down counter means output to thus open the feedback loop.

Relay contacts are indicated at 144 and are operable in the depicted position thereof to connect the comparator means input line 125 to ground through baseline resistor 146 and line 148 to thus enable the drive of the output of operational amplifier 102 substantially to 0 for baseline calibration as described in detail hereinbelow.

A standard or high calibration manually adjustable, potentiometer is indicated at 150, and a negative reference voltage −ER4 is applied thereto as indicated from a suitably regulated nonillustrated power supply source. For use of the apparatus of the invention with a 12-channel fluid analysis system as discussed hereinabove, 12 of the potentiometers 150 would be provided. The relay contacts 144 are effective, in the second position thereof, to apply the signals from the slide wires 152 of trimming potentiometers 150 to line 125, and said trimming potentiometers would be connectable in turn in synchronism with fluid sample analysis channel changes through said relay contacts. In use, each of the trimming potentiometers 150 will be effective to null out the error signal input, if any, to the comparator 128 to drive the output from operational amplifier 102 to a desired level, which will probably be different for each channel.

Control logic means are indicated at 154 and effective to shift the respective memories of the MOS shift registers 56 and 84 as indicated by lines 156 and 158 in synchronism with fluid sample analysis channel changes. In addition, the control logic means 154 effective to control the operation of three-position calibration network control switch means 134 as indicated by line 160.

In general, the respective comparator 128 and up/down counter 130 are arranged in such manner that the application of an error signal input for any given analysis channel calibration to said comparator will result in the provision of an input signal to said up/down counter to count up or down, depending upon the polarity of said error signal, and provide an appropriate digital signal to drive the relevant ladder network through the interconnected buffer of interest to the position or resistance value of said ladder network which will effectively null out said error signal by appropriate attendant variation in the output of the operational amplifier 102. In addition, such digital signal will, upon appropriate channel change signal from the control logic means 154, be shifted out of said buffer for storage in the relevant MOS shift register, for readout from the latter and reapplication to said buffer, again on appropriate channel change signal from said control logic means, when and only when said given fluid sample analysis channel is again reached.

Switch control logic means are indicated at 162 and are operable to control the respective electronic ladder switches 44 and 80 as indicated by lines 164 and 166, respectively. The switch control logic means 162 are, in addition, effective to control the operation of relay contacts 144 as indicated by line 168. The switch control logic means 162 are operable in a number of modes under the control of mode selector switches as indicated at 170, 172, 174 and 175. Mode selector switch 170 is operable, when actuated, to place the switch control logic means 162 in the manual baseline or low calibration mode, while mode selector switch 172 is operable, when actuated, to place the switch control logic means 162 in the manual standard or high calibration mode. Mode selector switch 174 is operable, when actuated, to place the switch control logic means 162 in the automatic baseline and standard calibration mode, while mode selector switch 175 is operable, when actuated, to place the switch control logic means 162 in the calibrate mode.

A baseline timer is indicated at 176 and the output signal therefrom is applied to the switch control logic means 162 as indicated by line 178. A standard timer is indicated at 180 and the output signal therefrom is applied to the switch control logic means 162 as indicated by line 182. Each of said baseline and standard timers is tied in as indicated by line 17 to the detector means 16 (FIG. 1) whereby the baseline timer 176 may be started by an appropriate signal from said detector means upon the detection of the trailing distilled water container of each of the distilled water and standard container groups, and may be arranged to "timeout" upon the arrival of the water from the trailing water container of each of said container groups at the colorimetric sample analysis means 9 and signal the switch control logic means 162 to that effect. In like manner, the standard timer 180 may be started by an appropriate signal from detector means 16 upon the detection of the trailing standard fluid container of each of said container groups, and may be arranged to "timeout" upon the arrival of the standard fluid from the trailing standard fluid container of each of said container groups at the colorimetric sample analysis means 9 and signal the switch control logic means 162 to that effect.

Meter means are indicated at 190 and are selectively connectable, as indicated through manually operable, three-position switch means 192, to ladder network 42 by line 194, and to ladder network 78 by line 196. Said meter means preferably take the form of an analog device in the nature of a milliammeter and are effective, for example, when connected as shown to ladder network 42 to display the analog equivalent of the digital setting of the latter through use, for example, of the four most significant bits of said digital setting, and effective to indicate the range of correction left in said ladder network to thereby indicate and alert the operator to any unusually large trends in apparatus drift as might require corrective action beyond the automatic calibration scope of the apparatus of the invention.

Nonillustrated alarm means may, in addition, be provided to trigger appropriate visible and/or audible alarm signals in the event that such drift, as indicated by the respective ladder network positions, has exceeded readily correctable limits. Too, nonillustrated channel indicator lamps may be provided for illumination on a per channel basis to inform the apparatus operator as to which of the 12 analysis channels of interest is operating. If desired, such channel indicating lamps may be tied into said alarm means in such manner that the channel indicating lamp for the channel exhibiting excessive drift will remain illuminated regardless of which analysis channel is then in operation.

In operation for use, for example, in the automatic baseline and standard calibration of 12 channel, fluid analysis means 5 which are generally configured and operable for the automatic sequential quantitative analysis of 32 blood samples with regard to 12 constituents of interest of each of the latter at a rate determined by a 40 minute time period for a complete revolution of turntable 6, it may be understood that, at apparatus turn on, the manual baseline mode selector switch 170 would be actuated and that a stream of water of clinical purity from any suitable source thereof in the nature of a wash liquid reservoir would be run through the colorimetric sample analysis means 9. The actuation of switch 170 will be effective to cause the switch control logic means 162 to simulate digital signals which are effective to drive each of the ladder networks 42 and 78 to the respective midrange or 10000000 positions thereof, and to open the respective ladder switches 44 and 80 so that the respective buffers 54 and 82 can have no effect on said ladder networks. In addition, calibration network control switch 134 is moved to the "out" position thereof to open the feedback loop through comparator 128 and up/down counter 130. Following this, the manual baseline potentiometer 24 for each channel is adjusted in turn, if necessary, concomitantly with visual observation of the trace of the recorder pen or stylus 122 on the portion of the recorder strip chart 120 which applies to said channel, to force said recorder pen to track through the 0 or baseline for each of said channels. More specifically, each of said baseline potentiometers is, in reality, adjusted in turn as described to provide a voltage EA at point $a$ of substantially 0 to thus ensure the provision of a voltage E$b$ at point $b$ of substantially 0 and thus effect recorder pen tracking through said 0 or baseline. This substantially 0 voltage provision is, of course, best verified by visual observation of said recorder pen track as described.

Figure 4:
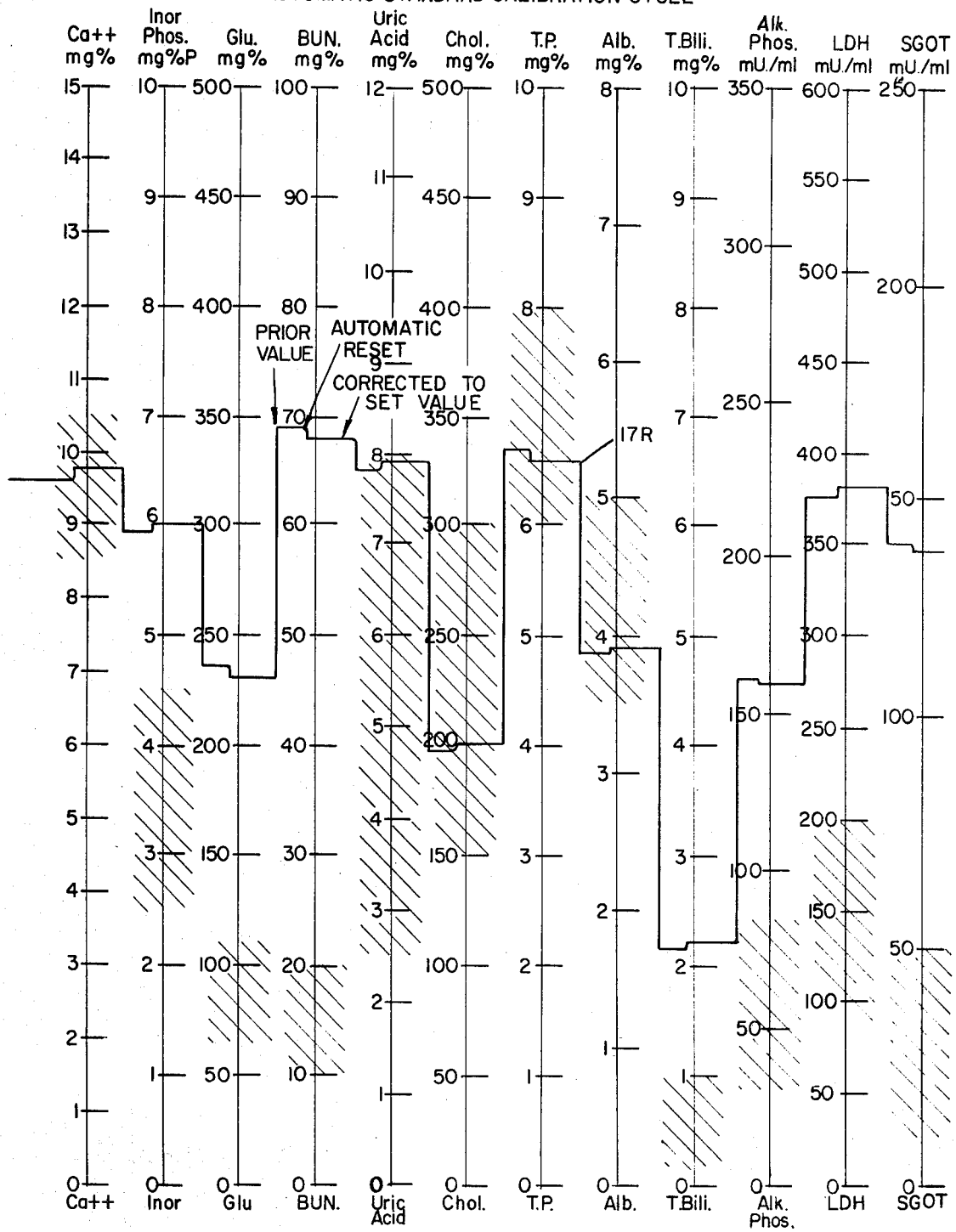
FIG. 4 is a graph illustrating the automatic standard or high correction function of the automatic calibration apparatus of FIG. 2.

Following this, a standard fluid, again from any convenient source, is run through the colorimetric sample analysis means 9, while calibration network control switch 134 is left in the "out" position thereof, manual baseline mode selector switch 170 is deactuated and manual standard mode selector switch 174 is actuated to again open the feedback loop through comparator 128 and up/down counter 130, open the respective ladder switches 44 and 80, and again force each of the ladder networks 42 and 78 to the respective midrange or 10000000 positions thereof through appropriate digital signal simulation and application by the switch control logic means 162. Manual standard calibration is then effected by the manual adjustment in turn, if necessary, of each of the 12 standard or high calibration potentiometers 72 with concomitant visual observation of the recorder pen track through each of the 12 blood sample constituent channel portions of the recorder strip chart 120 to ensure that said recorder pen is properly deflected to pass through a predetermined standard value on said chart for each of said blood sample constituents. More specifically, and taking for example the channel 3 blood sample constituent which is glucose as illustrated in FIG. 4, the predetermined value through which the recorder pen 122 should track for glucose in response to the passage of the standard fluid through colorimetric sample analysis means 9 is substantially 230 mg. percent and that this value is, of course, well known to the operator. Accordingly, if the recorder pen does not track substantially through this value for the glucose analysis channel, or analysis channel 3, said operator simply adjusts the relevant manual standard potentiometer to provide for such recorder pen tracking. Looked at in somewhat finer detail, if it is assumed, for example, that a recorder pen deflection appropriate to recorder pen tracking through the 230 mg. percent value on the glucose scale will require an input voltage E$b$ to the recorder 12 of substantially 30 mv., to in turn require an output voltage E$c$ from operational amplifier 102 of substantially 4.5 volts, the relevant manual standard potentiometer 72 will, of course, function to provide said requisite recorder input voltage.

At the completion of these adjustments of the respective manual baseline and standard calibration potentiometers as described, an apparatus initialization cycle or manual baseline procedure is commenced. This cycle is again under the manual control of the operator and is undertaken to load into the buffer 54 and MOS shift register 56 the per channel settings necessary to drive the ladder network 42 to the midrange position thereof for each of channels 1 through 12. This cycle is effected by the running of distilled water through the colorimetric sample analysis means 9, the movement of control switch 134 to the depicted position thereof to close the feedback loop through automatic baseline calibration means 41, and the actuation of the manual baseline mode selector switch 170 and the calibration mode selector switch 175 to cause the switch control logic means to close the ladder switch 44, only, and thus connect buffer 44 to ladder network 42, and to move relay contacts 144 to the depicted position thereof to ground one input to the comparator means 128 through line 148.

Upon the connection of buffer 44 for the first channel to ladder network 42, the latter will, in all probability, be driven from the midrange position thereof by the digital signal stored at that time in said buffer with the result that voltage E$c$ will accordingly assume a value other than 0 to result in the provision of the voltage E$c$ on line 124 and attendant provision of an input to the comparator means 128 on line 125 since E$c$ is not equal to E$d$ which is equal to 0.

As this occurs, said comparator means will generate an error signal E$f$ for application on line 132 to the up/down counter 130 with resultant counting by the latter, either up or down depending on the polarity of said error signal, and drive by said up/down counter of the buffer 54 in such direction that the ladder network 42 will be driven in turn back to the midrange or 10000000 position thereof with attendant return of E$c$ substantially to 0 and discontinuation of said error signal E$f$. In addition, the digital signal 1000000 will, of course, be stored in the buffer 54 for shifting under the control of control logic means 154 into the MOS shift register 56 upon commencement of this baseline initialization procedure for channel 2. The repetition of this procedure for each of the remaining channels 2 through 12 in that order will result in the complete setting up of the memory of the automatic baseline calibration means 41 through the storage of one digital signal 10000000 in the buffer 54 and 11 of such digital signals in the MOS shift register 56.

A second apparatus initialization cycle or manual standard procedure, again under manual control and effective to load into the buffer 82 and MOS shift register 84 the per channel settings necessary to drive ladder network 78 to the midrange or 10000000 position is then commenced by the running of the standard fluid through the colorimetric sample analysis means 9, the movement of calibration network control switch 134 to connect lines 136 and 142 and thus close the feedback loop through the automatic standard calibration means 76, and the actuation of mode selector switches 172 and 175 to close ladder switch 80, only, and thus connect buffer 82 to ladder network 78, and to move relay contacts 144 to apply the output from trimming potentiometer slidewire 152 as one input to comparator means 128 on line 125.

As the buffer 82 is connected through ladder switch 80 to the ladder network 78 for the first analysis channel, the latter will, in all probability, be driven from the midrange or 10000000 position thereof by the digital signal stored at that time in said buffer. The result is that the voltage Ec will accordingly assume a value other than the set value predetermined to effect tracking of the recorder pen 122 through the substantially 9.78 mg. percent point on the calcium scale of FIG. 4 which is, of course, the constituent scale of interest for said first analysis channel. Concomitantly, the voltage Ec will be applied to point d and summed thereat with that portion of the negative reference or bias voltage −ER4 being applied thereto from the arm 152 of the first analysis channel trimming potentiometer 150. Since the recorder pen 122 is not tracking properly, it may be assumed that Ec is not equal in magnitude to ER4 whereby an input voltage Ed=Ec—applied portion of voltage ER4 will be applied on line 125 to comparator means 128 with attendant application of an error signal Ef therefrom to up/down counter means 130 on line 132 and up or down counting of the latter, again in accordance with the polarity of said error signal, to drive buffer 82 and ladder network 78 accordingly and tend to return the latter to the midrange or 10000000 position thereof.

Of particular interest here, however, is the desire to have the recorder pen 122 track properly for the first analysis channel with the feedback loop closed and thus enable automatic standard or high calibration as described in detail hereinbelow. Although it is now known that the recorder pen will track properly for standard or high calibration for this first analysis channel—as a result of the above-described adjustment of the relevant manual standard calibration potentiometer 72—with the feedback loop open, it has not yet been ensured that such will occur with the feedback loop closed. Accordingly, manual adjustment of the arm 152 of the first analysis channel trimming potentiometer 150 is here effected by the operator until such time as the said pen is observed to track substantially at the predetermined standard or set value for calcium of substantially 9.78 mg. percent. Such trimming potentiometer adjustment functions to vary that portion of the negative bias voltage −ER4 which is applied to point d to vary the error voltage Ef applied to up/down counter 130 with attendant variation in Ec until such time as Ec and the applied portion of −ER4 are substantially equal in magnitude Ec—applied portion of voltage ER4 will become substantially equal to 0 to null out the input to comparator means 128 and discontinue the error signal Ef, with the ladder network 78 having been driven back to the midrange or 10000000 position thereof with the feedback loop closed, the digital signal 10000000 having been stored in buffer 82, and the recorder pen 122 having been suitably deflected to track through the predetermined set value for calcium, all as confirmed, of course, by visual observation of said recorder pen by the operator.

At the commencement of this standard initialization procedure for analysis channel 2, the digital signal 10000000 stored in buffer 82 for said channel will be shifted for storage into MOS shift register 84 under the control of control logic 154. The repetition of this procedure for each of the remaining analysis channel 2 through 12, in that order, and including the adjustment in each instance as described, if necessary, of the remaining trimming potentiometers 150 for said remaining analysis channels will result in the setting up of the memory of the automatic standard calibration means 76 through the storage of one digital signal 10000000 in the buffer 82 and 11 of such digital signals in the MOS shift register 84.

At the completion of this second apparatus initialization cycle or manual standard procedure, operation of the sample supply, treatment and analysis means 5 (FIG. 1) to automatically, sequentially analyze the blood samples in each of the 16 blood sample containers which extend between and include blood sample containers 198 and 200 as seen in FIG. 1 with regard to 12 different constituents of each of said blood samples is commenced by the indexing of the blood sample container 198 into the sample offtake position.

The automatic baseline and standard calibration means 15 of the invention are set for operation during the automated analyses of said 16 blood samples by the actuation of the automatic calibration mode selector switch 174 to place the switch control logic means 162 in the automatic calibration mode to close the respective ladder switches 44 and 80, and also by the movement of the three-position, calibration network control switch 134 to the "out" position thereof to thus open the feedback loop and prevent change in the digital signals which were stored in the respective MOS shift registers 56 and 84 and the respective buffers 54 and 82, as described in detail hereinabove during said apparatus initialization cycles. As a result, and since such digital signals were stored in channel-synchronized sequence in said MOS shift registers and buffers, the digital signals will be shifted out of said MOS shift registers into the respective buffers 54 and 82 to drive the respective ladder networks 42 and 78 to the respective midrange or 10000000 positions thereof under the control of the control logic means 154 in synchronism with the channel changes in the operation of the colorimetric sample analysis means 9.

More specifically, and taking for example the first or calcium constituent analysis channel, the recorder pen 122 commences to trace through the calcium scale on the recorder strip chart 120, the channel 1 digital signals which are effective to drive each of the ladder networks 42 and 78 to the respective midrange or 10000000 positions thereof will be automatically shifted into the respective buffers 54 and 82 to so drive said ladder networks. Following this, and upon channel change from channel 1 to channel 2 and the commencement of the track of the recorder pen 122 through the inorganic phosphate scale on the recorder chart 120, the control logic means 154 will be effective to signal each of the MOS shift registers 56 and 84 to shift the channel 1 digital signal from the respective buffers 54 and 82 back into the said shift registers, and to replace the same in said buffers with the channel 2 digital signals to again drive the respective ladder networks 42 and 78 to the respective midrange or 10000000 positions thereof.

Operation in this manner continues automatically until each of the blood samples from said 16 blood sample containers has been automatically analyzed in the colorimetric sample analysis means 9 with regard to said 12 constituents thereof, and the results of such analyses permanently recorded on the recorder stip chart 120, with the automatic baseline and standard calibration means 15 of the invention functioning to effect one complete cycle of the respective memories of the automatic baseline calibration means 41 and the automatic standard calibration means 76 for the recording of the results of the analyses of each of said blood samples.

Immediately following the aspiration of the blood sample from the last blood sample container 200 of this 16 container group, the leading distilled water container 202 will be indexed to the offtake position to commence system wash as discussed hereinabove. Immediately following this, the trailing distilled water container 204 will be indexed to said offtake position to trip detector 16 and commence the timing cycle of the baseline timer 176.

The automatic supply, treatment and analysis of the 16 blood samples as described by the sample supply, treatment and analysis means 5 may, of course, have resulted in significant recorder pen drift as discussed hereinabove due to the electronic, hydraulic and chemical operational characteristics of the same, with the result that the recorder pen will not track through the baseline as the distilled water from said leading distilled water container 202 flows through the colorimetric sample analysis means 9 to cleanse the latter as discussed hereinabove.

Subsequently, as the flow of the distilled water from the trailing distilled water cup 204 commences to flow through the colorimetric sample analysis means 9, the baseline timer 176 will timeout to indicate to the switch control logic means 162 that the next channel change to channel 1 will commence on automatic baseline calibration cycle. As this occurs, the calibration network control switch will be maintained in the "out" position thereof to maintain the feedback loop open, while the respective ladder switches 44 and 80 will be maintained closed. If it is assumed that there are approximately 4.5 seconds available for this automatic baseline calibration for each of channels 1 through 12, it may be understood that for the first 2.5 of these seconds, the switch control logic means 162 will simply drive ladder network 42 to the midrange or 10000000 position thereof, whereby the track of the recorder pen 122 will clearly indicate the actual drift, if any. At the expiration of these 2.5 seconds, the calibration network control switch 134 will be automatically moved to the depicted position thereof for 0.75 seconds to close the feedback loop through automatic baseline calibration means 41. In the event that drift has occurred, this will result in an error signal $Ef$ to the up/down counter means 130 from comparator means 128 with resultant drive of the ladder network 42 to a position other than said midrange or 10000000 position which will return the output voltage $Ec$ of the operational amplifier 102 substantially to 0 to discontinue said error signal, as described, and return the track of the recorder pen 122 to the 0 or baseline level on the calcium scale as may, of course, be readily confirmed by visual observation of the graph 16R of FIG. 3. Thus, in addition to having effectively calibrated the baseline for the first or calcium analysis channel, this operation of the automatic baseline and standard calibration means of the invention will have placed in buffer 54 a new or updated digital signal which is effective when applied to ladder network 42 to drive the same to a position to correct for whatever drift has occurred and cause said recorder pen to track properly to the baseline for this first or calcium analysis channel.

At the expiration of this 4.5 second period, this new or updated digital signal from buffer 54 will be shifted therefrom under the control of control logic means 154 into the MOS shift register 56 for repeated reuse as described hereinbelow. The calibration network control switch 134 will be automatically shifted back to the "out" position thereof at the commencement of the channel 2 automatic baseline calibration, and will again remain in such position for 2.5 seconds to maintain the feedback loop open, with the switch control logic means 162 again being effective to drive ladder network 42 to the midrange or 10000000 position thereof. Said control switch will then be automatically shifted back to the depicted position thereof for 0.75 seconds to again close the feedback loop as described with the result that the channel 2 drift, if any, will automatically be corrected for by the drive of the ladder network 42 to a position other than the midrange position thereof to again return the output voltage $Ec$ substantially to 0 with attendant tracking of the recorder pen 122 substantially through the channel 2 or inorganic phosphate scale on the recorder strip chart 120, again as clearly illustrated by the graph 16G of FIG. 3. The resultant new or updated channel 2 digital signal will be stored in the buffer 54 until shifted therefrom into the shift register 56 at the initiation of the channel 3 automatic baseline calibration.

This procedure is automatically repeated as described for each of the remaining 10 channels, whereby the calibration of the baseline for each of the 12 channels of interest will be rapidly and automatically effected and will include the storage in the MOS shift register 56 and buffer 54 of 12 new or updated digital signals (assuming not insignificant drift to have occurred in each of said twelve channels) for repeated reuse to properly position the ladder network 42 during the subsequent analyses of the succeeding 16 blood samples.

A particular advantage of the provision of a 2.5 second period during the automatic baseline calibration for each channel and prior to the automatic switching of the calibration network control switch back to the depicted position thereof to close the feedback loop resides in the fact that if excessive drift has occurred as ascertained by the visual observation of the track of the recorder pen 122, an effort may be made to correct for some, at least, of such excessive drift by manual adjustment of the relevant manual baseline adjustment potentiometer 24 during such 2.5 second period in each instance.

Following the aspiration of the distilled water from the trailing distilled water container 204, the leading standard fluid container 206 will be indexed into said offtake position to commence the aspiration of the standard fluid therefrom. Immediately following this, the trailing standard fluid container 208 will be indexed into said offtake position to trip the detector means 16 to commence the timing cycle of the standard timer 180. The standard fluid from said leading container 206 will simply flow through the colorimetric sample analysis means 9, primarily to insure the "cleansing" thereof as discussed hereinabove, while the recorder pen 122 simply tracks through a twelve channel cycle to clearly indicate the drift, if any, which has occurred with regard to the tracking of said recorder pen through the standard or set values of interest.

As the standard fluid from the trailing standard fluid container 208 commences to flow through the colorimetric sample analysis means 9, the standard timer 180 will timeout to indicate to the switch control logic means 162 that the next 12 channel cycle is an automatic standard calibration cycle. Accordingly, and as the next change to channel 1 occurs to commence said automatic standard calibration cycle, the switch control logic means 162 will be effective to drive the ladder network 78 to the midrange or 10000000 position thereof, while the calibration network control switch 134 will be automatically shifted to the "out" position to open the feedback loop. Operation with the ladder network 78 in said midrange position thereof and the feedback open will continue for 2.5 seconds during which the drift, if any, will be clearly discernable as illustrated by the graph 17R of FIG. 4. At the expiration of this 2.5 second period, the calibration network control switch 134 will be automatically shifted to connect the up/down counter 130 to the buffer 82 for 0.75 seconds with the result, assuming significant drift to have occurred, that an error signal $Ef$ will be applied from the comparator means 128 to the up/down counter means 130 to drive the ladder network 78 to a position thereof other than said midrange position to again force the output voltage $Ec$ of the operational amplifier 102 to become substantially equal to that portion of the bias voltage $-ER4$ which is applied as described from trimming potentiometer 150 through relay contact 144. As a result, the recorder pen 122 will be forced by deflection to track substantially through the standard or set value of substantially 9.79 mg. percent on the channel 1 or calcium scale, while the new or updated digital signal which was effective to drive ladder network 78 to accomplish such recorder pen deflection will, of course, be stored in the buffer 82 for subsequent shifting for storage into the MOS shift register 84 upon the change to channel 2.

This procedure is, of course, repeated in sequence for each of the remaining 11 analysis channels with the results that the automatic standard calibration thereof is rapidly and accurately effected, and a new or updated set of 12 digital signals which are, in each instance, appropriate to the correction of whatever drift had occurred in each of said 12 analysis channels, will be stored in the MOS shift register 84 and buffer 82, respectively, for repeated reuse during the analyses of the succeeding 16 blood samples.

As disclosed, the automatic baseline calibration function of the apparatus of the invention is performed by the automatic shifting, if required, of the equivalent curve of optical density versus concentration to compensate for drift-occasioned curve offset for each of the blood sample constituents of interest and insure that said curve passes substantially through the zero concentration point in each instance; while the automatic standard calibration function of the invention is performed by the automatic adjustment, if required, of the slope of said curve to compensate for drift-occasioned slope change for each of the blood sample constituents of interest and ensure that said curve passes substantially through the predetermined standard concentration point in each instance.

Figure 3:
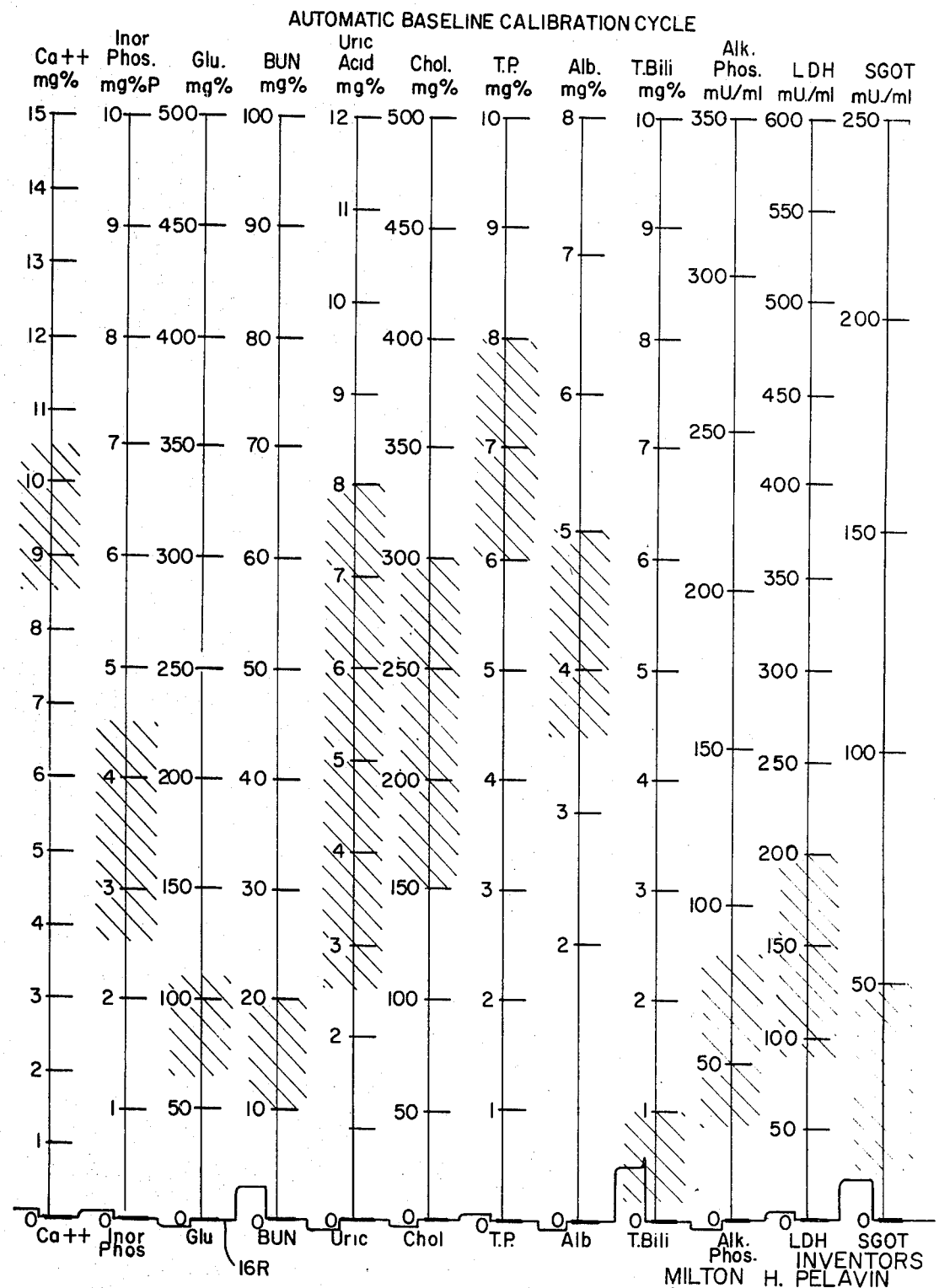
FIG. 3 is a graph illustrating the automatic baseline or low correction function of the automatic calibration apparatus of FIG. 2.

The extraordinary accuracy of the automatic baseline and standard calibrations for each of the 12 analysis channels of interest which is provided by the method and apparatus of the invention are believed clearly illustrated by the respective automatic baseline and standard calibration cycle graphs 16R and 17R of FIGS. 3 and 4.

The depicted arrangement of the respective sample, distilled water and standard fluid container on the turntable 6 in FIG. 1 is, of course, intended as illustrative only of one container arrangement that may be used in conjunction with the automatic baseline and standard calibration means 15 of the invention. More or less frequent automatic baseline and standard calibration may readily be provided for by the inclusion of more or less of said sample containers in each of the sample container groups as are delineated by the four container, distilled water and standard fluid container groups which initiate and operate the automatic baseline and standard calibration function of the invention as described. Thus, for less frequent calibration for example, the turntable 6 might include a total of 72 containers with 60 of the same being constituted by sample containers and arranged in three groups of 20 containers each, and the remaining twelve thereof being constituted by three, four distilled water and standard fluid container groups which are disposed at 20 sample container intervals as should be obvious. Whatever turntable configuration is utilized, the automatic baseline and standard calibration means 15 of the invention can be utilized to automatically provide rapid and accurate baseline and standard calibration as desired.

Although disclosed by way of example herein as applied to the automatic baseline and standard calibration of automatic, sample supply, treatment and analysis means which are directed toward the quantitative analysis of a series of blood samples, the apparatus of the invention would be equally applicable to such sample supply, treatment and analysis means as are directed to the analysis of fluids other and different than blood samples, and/or to nonfluid samples.

Too, and although disclosed as utilizing detector means which are operatively associated as described with the turntable 6 to commence operation of the respective baseline and standard timers, it may be understood that the said detector means may be configured and operative in a wide variety of other and different manners. Thus, for example, the detection of the respective baseline and standard calibration fluids may be effected through the inclusion therein of very small quantities of radioactive materials, and the operative association of radiation detecting means with the colorimetric sample analysis means 9 to detect such materials and operate said baseline and standard timers accordingly.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

We claim:

1. In calibration apparatus for the automatic, periodic baseline and standard calibration of analysis results recording means which record the results of sample analysis performed by sample analysis means, in accordance with the output of the latter, so as to compensate for drift in said analysis means output, and which include means to condition said sample analysis means and adjust said output to a desired value for baseline calibration, and means to condition said sample analysis means and adjust said output to a desired value for standard calibration, the improvements comprising, means to compare said output with said desired value thereof for baseline calibration and, in the event that drift has occurred, to generate information which is effective to drive said output to said desired value thereof to effect baseline calibration, and means to compare said output with said desired value thereof for standard calibration and, in the event that drift has occurred, to generate information which is effective to drive said output to said desired value thereof for standard calibration, said means to drive said output to said desired values thereof for standard and baseline calibration, respectively, further including logic means to store said baseline and standard calibration information for use during subsequent sample analysis operation of said sample analysis means and automatic means to periodically update said stored baseline and standard calibration information by the baseline and standard calibration information generated upon a subsequent calibration operation of said calibration apparatus.

2. In calibration apparatus as in claim 1 wherein, said means to drive said output to said desired value thereof for baseline calibration comprises a baseline calibration circuit to which said output is applied, said baseline calibration circuit having a circuit component of operational characteristics which are variable in response to the application of said baseline calibration information thereto, and which is in turn effective to vary said output in accordance therewith, and means to apply said baseline calibration to said circuit component, and said means to drive said output to said desired value thereof for standard calibration comprise a standard calibration circuit to which said output is applied, said standard calibration circuit having a circuit component of operational characteristics which are variable in response to the application of said standard calibration information thereto and which is in turn effective to vary said output in accordance therewith, and means to apply said standard calibration information to said standard calibration circuit component.

3. In calibration apparatus as in claim 1 wherein, said means to compare said output with said desired values thereof for baseline and standard calibration, respectively, comprises a feedback network including operatively associated comparator and up/down counter means, means to apply the differences, if any, between said output and the desired values thereof for baseline and standard calibration, respectively, to said comparator means to generate error signals in accordance therewith, and means to apply said error signals to said up/down counter means for generation by the latter of said information for baseline and standard calibration.

4. In calibration apparatus as in claim 1 wherein, said means to store said baseline and standard calibration information respectively comprise operatively associated buffer and shift register means, and means to circulate said information therebetween, with said information in said buffers at any given time being respectively effective to drive said output to said desired values thereof for baseline and standard calibration.

5. In calibration apparatus as in claim 2 wherein, said output is an electrical signal and said baseline and standard calibration circuit components respectively comprise ladder networks of variable resistance values.

6. In calibration apparatus as in claim 2 wherein, said means to compare said output with said desired values thereof for baseline and standard calibration, respectively, comprises a feedback network including operatively associated comparator and up/down counter means, means to apply the differences, if any, between said output and the desired values thereof for baseline and standard calibration, respectively, to said comparator means to generate error signals in accordance therewith, and means to apply said error signals to said up/down counter means for generation by the latter of said information for baseline and standard calibration.

7. In calibration apparatus as in claim 6 wherein, said baseline calibration circuit comprises means to store said baseline calibration information for use during subsequent sample analysis operation of said sample analysis means and to enable updating of said baseline calibration information by the baseline calibration information generated upon subsequent calibration operation of said calibration apparatus, and said standard calibration circuit comprises means to store said standard calibration information for use during subsequent sample analysis operation of said sample analysis means and to enable updating of said standard calibration information by the standard calibration information generated upon subsequent calibration operation of said calibration apparatus.

8. In calibration apparatus as in claim 7 wherein, said means to store said baseline calibration information comprise buffer and shift register means which are operatively associated to enable the circulation of said baseline calibration information therebetween, and said means to store said standard calibration information comprise buffer and shift register means which are operatively associated to enable the circulation of said standard calibration information therebetween.

9. In calibration apparatus as in claim 8 wherein, said baseline calibration circuit comprises means operatively connecting said baseline calibration information buffer to said baseline calibration component for application of said baseline calibration information from said buffer to said circuit component, said standard calibration circuit comprises means operatively connecting said standard calibration information buffer to said standard calibration circuit component for application of said standard calibration information from said buffer to said standard calibration circuit component, said means to drive said output to said desired value thereof for baseline calibration comprise means to apply said baseline calibration information from said up/down counter means to said baseline calibration information buffer, and said means to drive said output to said desired value thereof for standard calibration comprise means to apply said standard calibration information from said up/down counter means to said standard calibration information buffer.

10. In calibration apparatus as in claim 9 wherein, said output is an electrical signal and said baseline and standard calibration circuit components respectively comprise ladder networks of variable resistance values.

11. In calibration apparatus as in claim 10 wherein, said means operatively connecting said baseline and standard calibration information buffers and said baseline and standard calibration ladder networks respectively comprise baseline and standard calibration circuit ladder switches.

12. In calibration apparatus as in claim 1 wherein, said sample analysis means comprise a plurality of sequentially operable sample analysis channels for the analysis of a plurality of samples, and said means to condition said sample analysis apparatus and adjust said output for baseline and standard calibration are effective for each of said channels, and wherein said means to generate said baseline calibration information are effective to generate the same for each of said analysis channels in sequence with the changing thereof, and said means to generate said standard calibration information are effective to generate the same for each of said analysis channels in sequence with the changing thereof.

13. In calibration apparatus as in claim 1 wherein, said sample analysis means comprise a plurality of sequentially operable sample analysis channels for the analysis of a plurality of samples, and said means to condition said sample analysis apparatus and adjust said output for baseline and standard calibration are effective for each of said channels, and wherein said means to generate said baseline calibration information are effective to generate the same for each of said analysis channels in sequence with the changing thereof, said means to generate said standard calibration information are effective to generate the same for each of said analysis channels in sequence with the changing thereof, and said baseline and standard calibration storage means are operable to store and circulate said baseline and standard calibration information in sequence with said sample analysis means channel changes for use thereof during subsequent sample analysis means operation.

14. In calibration apparatus as in claim 13 wherein, said means to drive said output to said desired value thereof for baseline calibration comprises a baseline calibration circuit to which said output is applied, said baseline calibration circuit having a circuit component of operational characteristics which are variable in response to the application of said baseline calibration information thereto, and which is in turn effective to vary said output in accordance therewith, and means to apply said baseline calibration to said circuit component, and said means to drive said output to said desired value thereof for standard calibration comprise a standard calibration circuit to which said output is applied, said standard calibration circuit having a circuit component of operational characteristics which are variable in response to the application of said standard calibration information thereto and which is in turn effective to vary said output in accordance therewith, and means to apply said standard calibration information to said standard calibration circuit component.

15. In calibration apparatus as in claim 9 wherein, said sample analysis means comprise a plurality of sequentially operable sample analysis channels for the analysis of a plurality of samples, and said means to condition said sample analysis apparatus and adjust said output for baseline and standard calibration are effective for each of said channels, and wherein said means to generate said baseline calibration information are effective to generate the same for each of said analysis channels in sequence with the changing thereof, and said means to generate said standard calibration information are effective to generate the same for each of said analysis channels in sequence with the changing thereof.

16. In calibration apparatus as in claim 15 further comprising, control means which are operatively associated with said baseline calibration information shift register and said standard calibration information shift register and are operable to respectively shift said baseline calibration information for each of said analysis channels from said baseline calibration information shift register to said baseline calibration information buffer in sequence with said analysis channel changes, and to shift said standard calibration information for each of said analysis channels from said standard calibration information shift register to said standard calibration information buffer in sequence with said analysis channel changes.

17. In a method for automatically calibrating sample analysis means to compensate for drift in the baseline and standard calibrations of output signals generated by said sample analysis means in accordance with the output of said sample analysis means to compensate for drift in said output, and which includes conditioning of said sample analysis means and adjusting said output to a desired value for baseline calibration, and conditioning said sample analysis means and adjusting said output to a desired value for standard calibration, the improvement comprising the steps of, during a calibration operation, comparing the output of said analysis means with a desired value thereof for baseline calibration and, in the event that drift has occurred, generating information which is effective to drive said output to said desired value thereof to effect baseline calibration, comparing the output of said analysis means with a desired value thereof for standard calibration and, in the event that drift has occurred, generating information which is effective to drive said output to said desired value thereof to effect standard calibration, logically storing said baseline and standard calibration information for use during subsequent sample analysis operation of said sample analysis means, and automatically periodically updating said stored baseline and standard calibration by the baseline and standard calibration information generating during a subsequent calibration operation.

18. In a method as in claim 17 wherein, the steps of comparing said output with said desired values thereof for baseline and standard calibration further includes the steps of generating error signals in accordance with the differences, if any, therebetween, and generating said baseline and standard calibration information in response to said error signals.

19. In a method as in claim 17 wherein, the steps of storing said baseline and standard calibration information comprise the further step of providing the respective stored baseline and standard calibration information available at any given time to drive said output to said desired values thereof for baseline and standard calibration, respectively.

20. In a method as in claim 19 wherein the step of driving said output to said desired value thereof for baseline calibration comprises the further step of applying said baseline calibration information and said standard calibration information concurrently to modify an output signal.

21. In a method as in claim 17 comprising the further steps of comparing the output of each of a plurality of sample analysis channels sequentially during a calibration operation, generating baseline calibration information and standard calibration information corresponding to each of said analysis channels in sequence with the changing thereof, and storing said baseline and standard calibration information for each of said sample analysis channels for use during subsequent samples analysis operation of corresponding analysis channels.

22. In calibration apparatus for the automatic, periodic baseline and standard calibration of analysis results recording means which record the results of sample analysis performed by sample analysis means, in accordance with the output of the latter, so as to compensate for drift in said analysis means output, and which include means to condition said sample analysis means and adjust said output to a desired value for baseline calibration, and means to condition said sample analysis means and adjust said output to a desired value for standard calibration, the improvements comprising, means to periodically compare said output of said sample analysis means conditioned for baseline calibration with said desired value thereof for baseline calibration, means to generate a first signal indicative of any baseline drift which has occurred, means to compensate said analysis means output according to said first signal to effect baseline calibration, and means to compare said output of said sample analysis means conditioned for standard calibration with said desired value thereof for standard calibration, means to generate a second signal indicative of any standard drift which has occurred, means to compensate said analysis means output according to said second signal to effect standard calibration, and logic means for storing and periodically updating said first and second signals for use during subsequent operations of said automatic sample analysis means.

23. In a method for automatically calibrating sample analysis means to compensate for drift in the baseline and standard calibrations of output signals generated by sample analysis means in accordance with the output of said sample analysis means to compensate for drift in said output, and which includes conditioning said sample analysis means and adjusting said output to a desired value for baseline calibration, and conditioning said sample analysis means and adjusting said output to a desired value for standard calibration, the improvement comprising the steps of periodically comparing said output of said sample analysis means conditioned for baseline calibration with said desired value thereof for baseline calibration and, in the event that any baseline drift has occurred, generating a first signal indicative of said any baseline drift, compensating said analysis means output according to said first signal to effect baseline calibration, periodically comparing said output of said sample analysis means conditioned for standard calibration with said desired value thereof for standard calibration and, in the event that any standard drift has occurred, generating a second signal indicative of said any standard drift, compensating said analysis means output according to said second signal effect standard calibration, and logically storing and periodically updating said first and second signals for use during subsequent operations of said automatic sample analysis means.

24. In calibration apparatus as in claim 1 further comprising means to indicate the drift which has occurred.

25. In calibration apparatus as defined in claim 13 further including means to indicate the drift which has occurred in selected ones of said sample analysis channels.

26. In a method as in claim 17 further comprising the further step of indicating the drift which has occurred.

27. In a method as in claim 21 comprising the further step of indicating the drift which has occurred in selected ones of said sample analysis channels.

* * * * *